United States Patent [19]
Balane et al.

[11] 3,973,366
[45] Aug. 10, 1976

[54] COMPOSITE PRESET BLOCK FOR UNDERFLOOR WIRE DISTRIBUTION SYSTEMS

[75] Inventors: David A. Balane, Franklin; Herman P. Manzeck, Belgium, both of Wis.

[73] Assignee: Inryco, Inc., Melrose Park, Ill.

[22] Filed: Mar. 4, 1974

[21] Appl. No.: 447,580

[52] U.S. Cl. .................................. 52/99; 29/433; 52/100; 52/221; 52/741; 174/48; 220/3.4
[51] Int. Cl.² .................... E04F 17/08; E04F 19/08
[58] Field of Search ...................... 174/48; 220/3.4; 52/98–100, 221, 741; 29/433

[56] References Cited
UNITED STATES PATENTS

| | | | |
|---|---|---|---|
| 1,776,656 | 9/1930 | Frederickson | 52/221 |
| 2,125,366 | 8/1938 | Young et al. | 52/221 |
| 3,082,504 | 3/1963 | Tatsch | 52/221 X |
| 3,253,730 | 5/1966 | Mount | 220/3.4 |
| 3,303,264 | 2/1967 | Saul et al. | 52/221 X |
| 3,426,492 | 2/1969 | Fork | 52/221 |
| R28,035 | 6/1974 | Fork | 52/221 X |

Primary Examiner—Alfred C. Perham
Attorney, Agent, or Firm—Merriam, Marshall, Shapiro & Klose

[57] ABSTRACT

Method and means for adapting a poured concrete floor above a wire distribution system for installing outlets connecting with said system. A composite block assembly comprising a rupturable block covered by a hold-down plate having an access opening is preset at selected locations in the floor before the concrete is poured. To complete an outlet installation, the concrete above the access opening in an assembly is removed and the material of the block is withdrawn through the access opening, leaving a void in the concrete floor in which the components of an outlet assembly can be installed.

7 Claims, 7 Drawing Figures

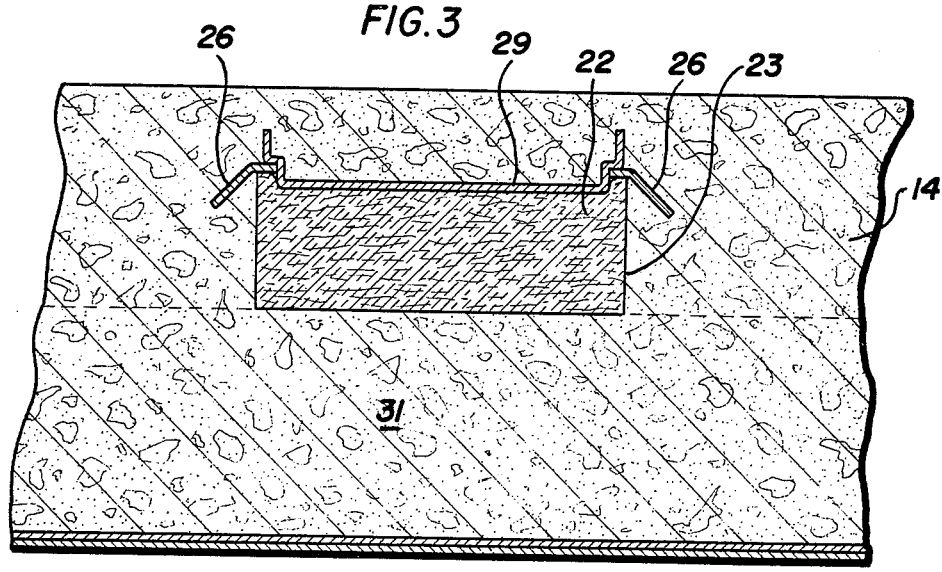
FIG.3
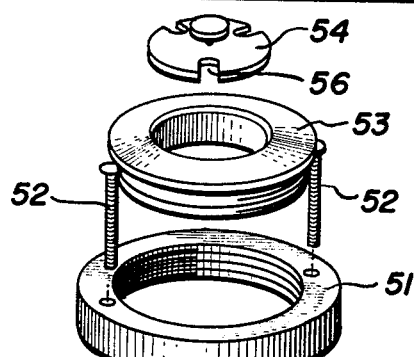
FIG.4
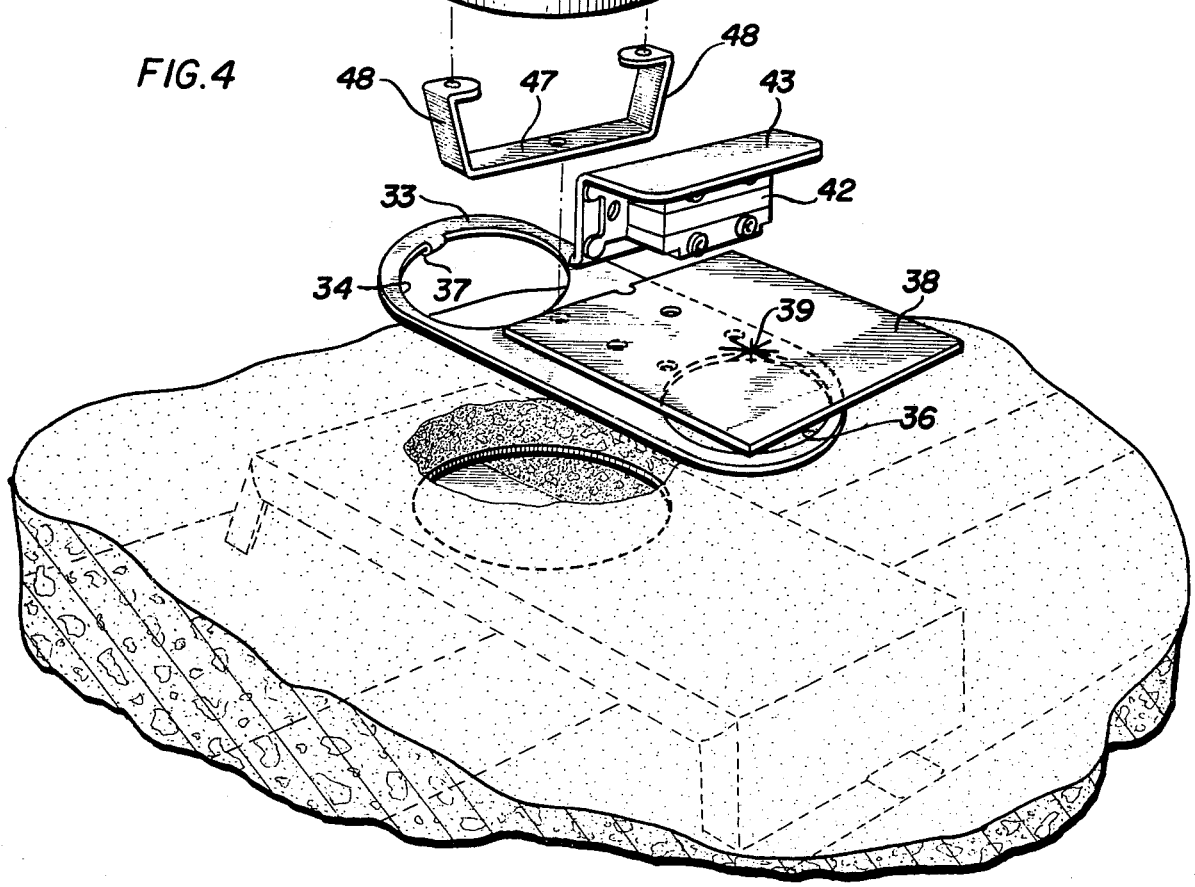

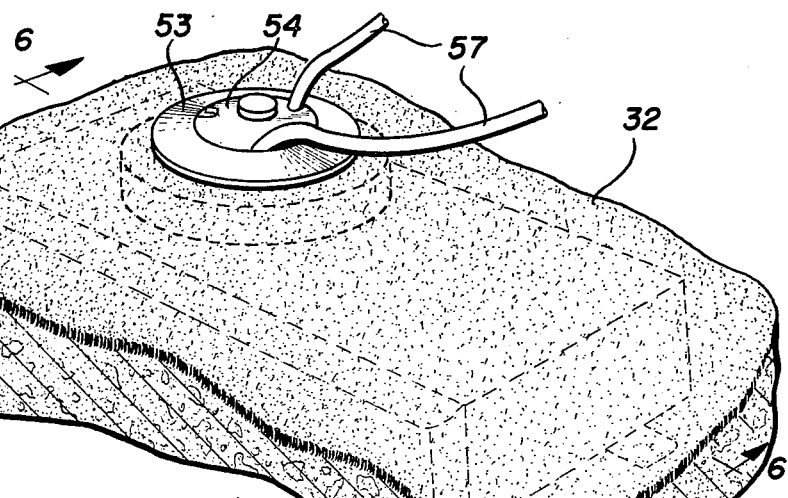
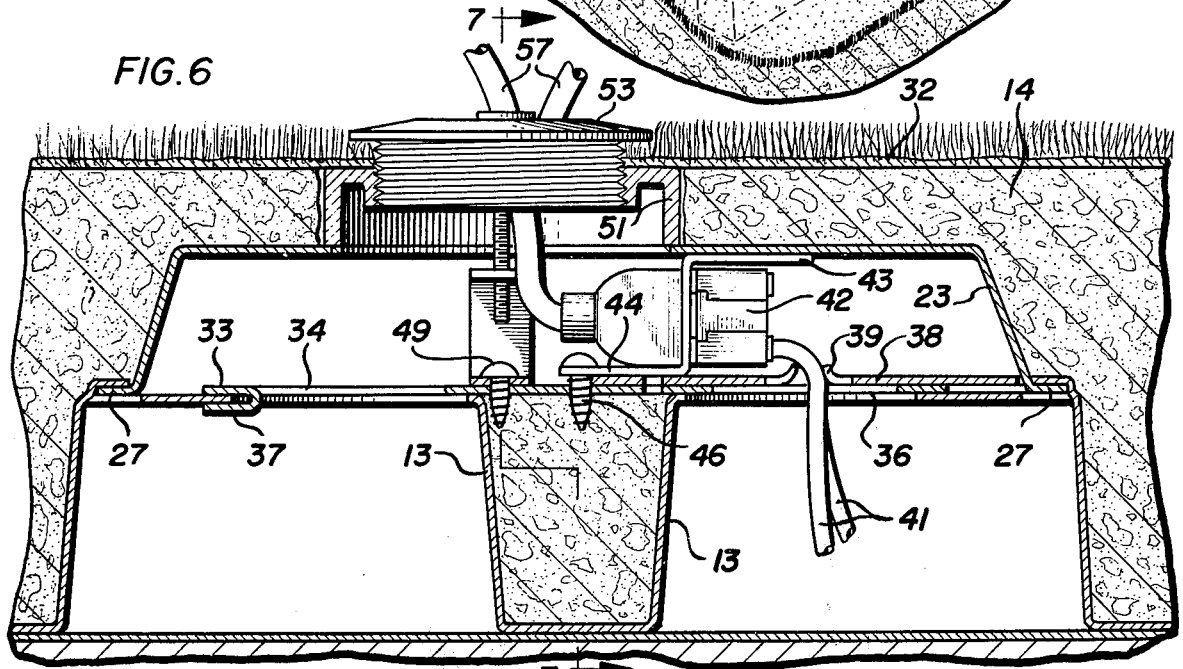
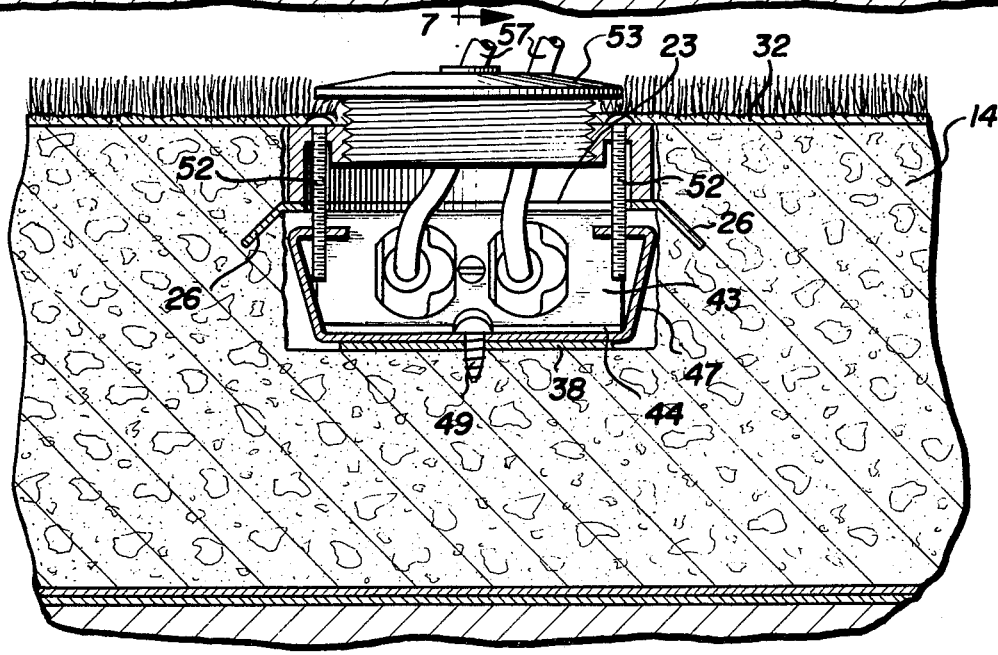

COMPOSITE PRESET BLOCK FOR UNDERFLOOR WIRE DISTRIBUTION SYSTEMS

The present invention relates to a method and means for providing power and telephone outlets and the like in poured concrete floors. More particularly, it concerns a relatively low cost system for readily providing outlets at preselected locations after the floor has been poured and set. The invention involves the use of a preset composite block assembly at selected locations on the floor deck over which concrete is poured. Each composite block assembly includes a block of a rupturable material which is thermally insulating and fire resistant, covered by a plate having an access opening, through which the material of which the block is formed can be readily removed. After the concrete is poured and set, an outlet connection can be made at the location of a composite block assembly by chipping away the concrete overlying the access opening in the plate and removing the block material therethrough. The void thus created in the concrete floor is then available for completion of the installation according to conventional electrical or communications practice.

BACKGROUND OF THE INVENTION

Poured concrete floors have come into widespread use. In general, such floors comprise a cellular, fluted metal, or corrugated raceway floor deck over which a concrete slab is poured. The cellular metal deck or floor is provided with holes, usually pre-punched at the factory, through which access to electrical or communication lines installed within the cellular raceways of the floor can be had.

In the prior art, the connection of a floor outlet to the electrical or communiction system within the underfloor assembly has generally been accomplished by either of two relatively costly operations. In one prior art approach, an access box is preset into holes located on the top surface of the cellular metal floor. The concrete is then poured over the floor and box, leaving the top access portion of the box substantially exposed. In order to provide flexibility in the number and location of electrical and communication outlets, the need for which may vary substantially over a period of time, a large number of preset insert access boxes must be used, only a small number of which may actually be used. The large initial equipment cost necessary to provide these access boxes at numerous locations is a serious problem connected with the use of such a system.

The other general approach heretofore employed involves the use of so-called afterset inserts at the desired locations. In this method, no preset access boxes are used. Instead, the concrete floor is drilled or cored at the desired locations when necessary. While the use of afterset access boxes reduces the initial equipment cost, it has the disadvantage arising from the fact that concrete coring through the full thickness of the floor is a laborious and expensive operation. Moreover, when it is necessary to relocate outlets because of floor plan changes and the like, concrete coring causes a serious disruption in office operations.

The present invention provides an improved means and method for supplying electrical and communications outlets in poured concrete floors which overcome to a large extend the problems heretofore presented. While the invention involves the use of preset units, they are relatively inexpensive, thereby greatly reducing the high equipment cost of the preset method of floor installation. In addition, the invention eliminates the extensive coring operations and the consequent disruption of office procedures which havee heretofore characterized the use of afterset access boxes.

BRIEF SUMMARY OF THE INVENTION

Briefly described, the present invention provides a method and low cost means for adapting a poured concrete floor for connection of outlet boxes as desired. The invention involves the use of a preset composite block assembly including a block formed of a material which is thermally insulating and non-combustible, and a hold-down cover plate extending over at least the top surface of the block, and preferably at least two opposed ends in addition, which is used to fasten the block on the floor duct system in a position such that the block covers one or more access apertures in the raceways of the floor. The hold-down plate is provided with an access opening, in which there is preferably inserted an easily removable cover cap.

The block is composed of an easily rupturable material which permits it to be readily removed through the hold-down plate, by tearing or breaking the exposed surface of the block and removing the pieces through the access opening. The function of the block is to create a void in the set concrete through which the necessary components and connections for completing the outlet installation can be made. Since it is possible that the block may remain permanently in the floor, the block material should be compatible with permanent disposition in the concrete floor. The addition, in order to maintain the thermal and fire resistant properties of the floor, the block should not deteriorate over a long period of time. Suitable materials for making the block include fiberglass, mineral board, gypsum board, foamed plastics, and other easily ruptured foamed or fibrous materials which are insulating and fire-resistant.

BRIEF DESCRIPTION OF THE DRAWINGS

The invention will be better understood from the following detailed description thereof, in conjunction with the accompanying drawings, in which:

FIG. 3 is a sectional view along the line 3—3 of FIG. 2, showing an end view of the block assembly;

FIG. 4 is an exploded view of a typical set of fittings and components which can be used for completing an electrical outlet in conjunction with the composite block assembly of the invention;

FIG. 5 is a perspective view of a typical outlet installation, using the components of FIG. 4 in a poured concrete floor;

FIG. 6 is a sectional view along the line 6—6 of the completed electrical outlet installation of FIG. 5; and FIG. 7 is a sectional view of the installation of FIG. 6 along the line 7—7.

DETAILED DESCRIPTION

Figure 1:
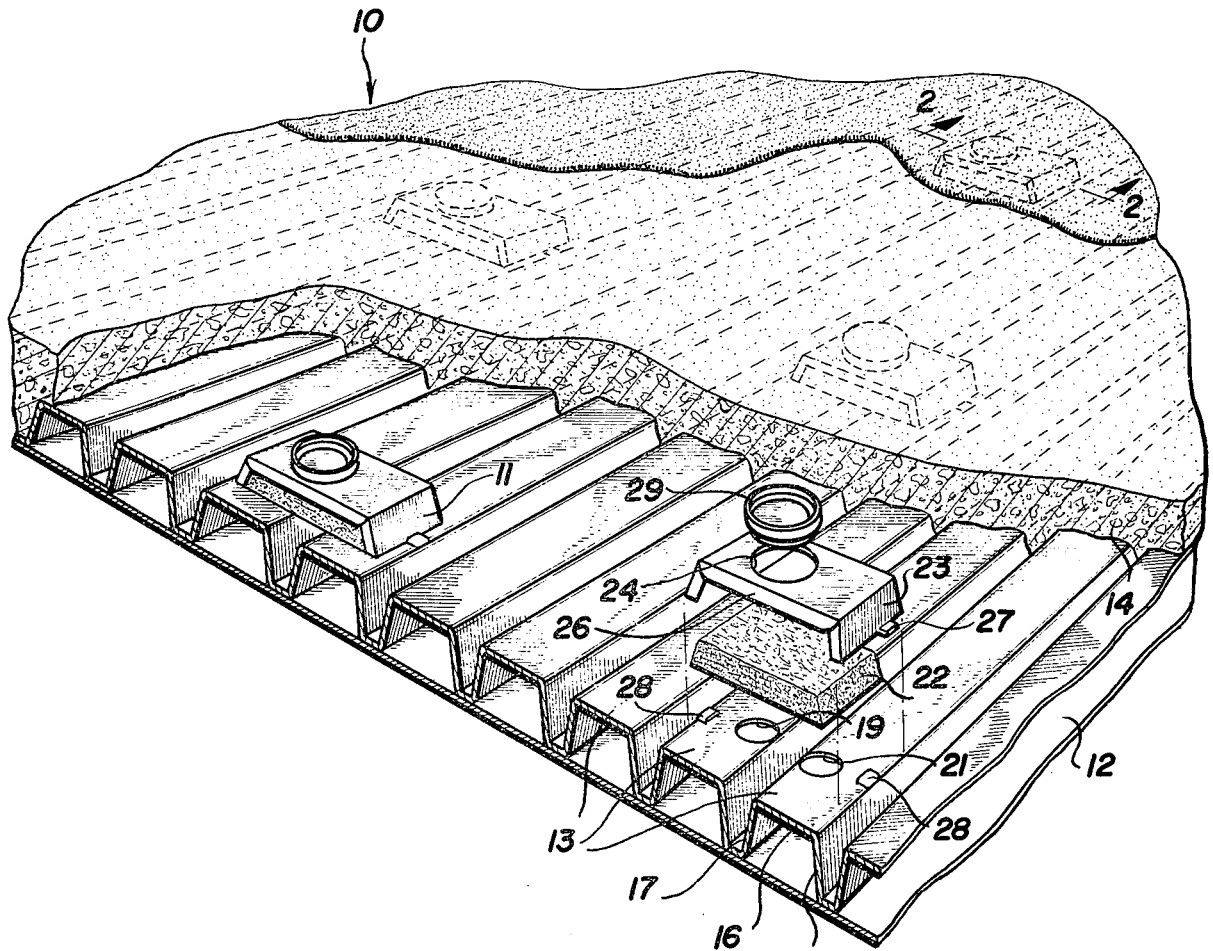
FIG. 1 is a partially broken away perspective view of a poured concrete floor installation, showing the preset composite block assemblies of the present invention located in several positions in the floor.

Referring to the drawings, FIG. 1 shows a finished poured concrete floor 10 provided with preset composite block assemblies 11 in accordance with the invention. The finished floor 10 comprises a corrugated cellular steel raceway panel or deck 12 including individual cellular raceways 13, the floor being covered with a concrete slab 14. Each raceway 13 has a top portion 16 and side walls 17 and 18 depending from the marginal edges of the top portion 16. The raceways 13 have a plurality of access holes or apertures, e.g. 19, 21, situated at a variety of prospective outlet locations. While the apertures 19, 21 are generally pre-punched at the factory, they can also be made at the construction site. Each composite block assembly 11 consists of a block 22 of a rupturable material provided with a hold-down plate or cover 23 equipped with a top access opening 24. Each hold-down plate 23, typically made of sheet metal, substantially covers at least the top surface of each block 22 and also preferably two opposed ends of the block, so that the ends of the hold-down plate rest on the top of raceways 13. In a preferred embodiment, hold-down plate 23 is also provided with depending flanges 26 (FIG. 3) along two opposite edges of the top surface. Flanges 26 become embedded in the concrete of the floor and help to support the floor above the block assembly, particularly after the block 22 is removed in making an outlet installation. Each hold-down plate 23 is provided with means such as tabs 27 which hold plate 23 and block 22 in position on the top 16 of the raceway, by engaging preformed slots 28 in raceways 13. Other means for fastening the hold-down plate in position, such as bolts, rivets, or welding, can also be used. It is preferred that each block be so positioned as to cover an opening, e.g., 19, 21, in each of two or more adjacent raceways, thereby providing for access to each of said raceways in one installation. In use, one raceway might be used for providing electrical power connections while the adjacent raceway might be used for telephone or other communications lines. Although access opening 24 in hold-down plate 23 can be left open, it will be generally found desirable to provide a cover cap 29 which frictionally engages the opening 24 and insures against excessive seepage of moisture from the concrete into the composite block assembly.

Figure 2:
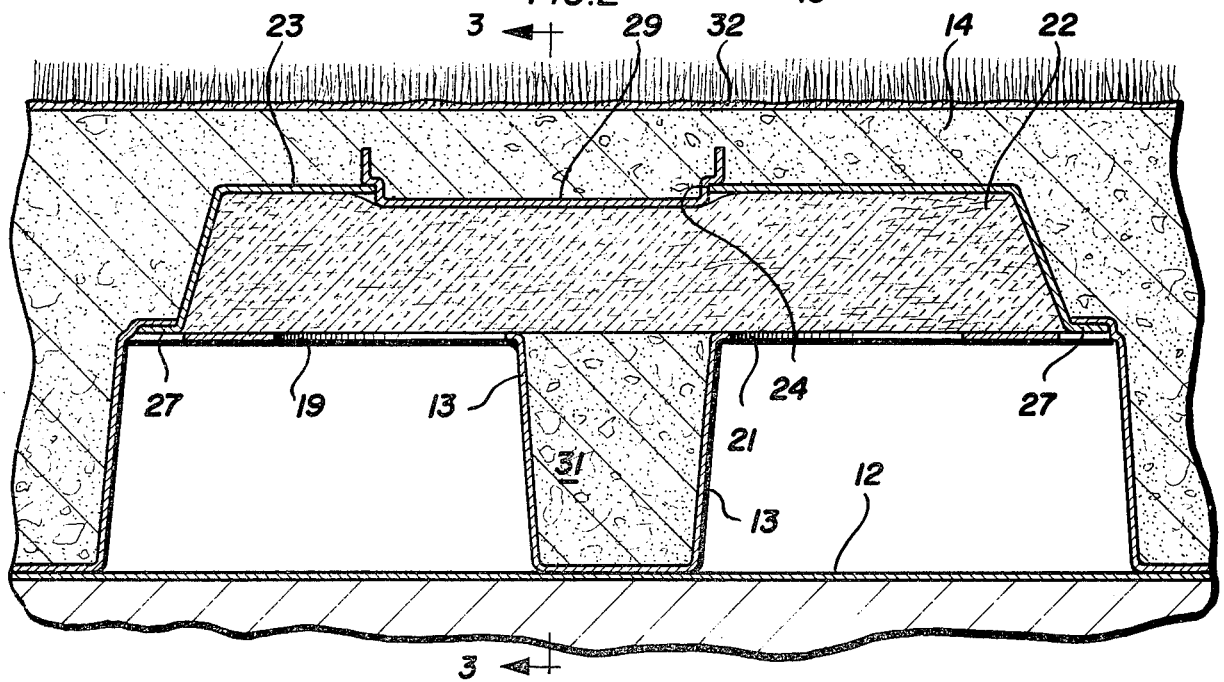
FIG. 2 is a sectional view taken along the line 2—2 of FIG. 1, showing a composite block assembly embedded in the concrete of the floor.

The structure of a floor installation embodying the invention is shown in FIGS. 2 and 3. As shown therein, concrete 14 covers the top of the composite block assembly to a depth which is suitably about one half inch or more. All of the exposed sides of the block assembly are also covered by concrete, including the zone 31 below the assembly and between the adjacent raceways 13. The floor is provided in conventional fashion with a suitable covering, such as carpet 32 or tiles (not shown).

The installation of FIGS. 2 and 3 will remain in the condition shown until such time as it is desired to provide an outlet installation in the particular location. When an outlet installation is desired, it is made in the following manner. The carpet 32 or other floor covering is removed and the exact position of the composite block assembly is determined in a suitable manner, as by using a magnetic metal detector responsive to the metal of the hold-down plate 23, or by measurement in accordance with a known placement plan of the composite block assemblies. The relatively thin concrete layer above the access opening 24 in hold-down plate 23 is removed in any convenient manner, such as by fracturing with a hammer and/or chisel, to expose access opening 24. If a cover cap 29 is used, it is removed through the opening in the floor thus provided. The material forming block 22 is then removed through the access opening 24 in any convenient manner. In order to facilitate the removal of this material, it is desirable that block 22 be formed of a substance which can be readily fractured, torn, or broken for removal, leaving a void in the floor beneath hold-down plate 23, and uncovering apertures 19 and 21 in the tops of the adjacent raceways.

The fittings which can be used to make a typical complete outlet assembly are depicted in FIG. 4. In this view, the individual components are positioned in the sequence in which they would be installed. It should be understood, however, that some of these items are placed below hold-down plate 23, whereas others of them will extend above and through access opening 24 therein up to the surface of the floor. The individual items of FIG. 4 are shown assembled in FIGS. 6 and 7. To make the assembly shown in these figures, elongated support plate 33 is passed through access opening 24 in the top of hold-down plate 23 and adjusted so that the openings 34 and 36 in the support plate overlie apertures 19 and 21 in adjacent raceways 13. Support plate 33 is suitably provided with a lug 37 which engages the rim of aperture 19 for additional support. In addition, support plate 33 can be permanently fastened in place by means of a pop rivet or screw (not shown) engaging the top of one of the raceways. On top of support plate 33 is placed a section of a suitable thermal insulating material such as asbestos composition sheet 38 provided with a scored opening 39 through which the power cords 41 of an electrical distribution system can be passed. In addition, solid sublimate chips (not shown) or other fire resistant material may be added to increase fire resistance through the activated fitting. These fire resistant solids normally under elevated temperatures sublimate directly from a solid to vapor thereby absorbing heat or cooling the outlet fitting void. An electrical power outlet jack 42 attached to bracket 43 and having a flange 44 is fastened by means of screw 46 in position on top of support plate 33. Supporting bracket 47 provided with a pair of upstanding arms 48 is fastened to support plate 33 by means of screw 49 in a location such that it is centered in the access opening 24 in hold-down plate 23. A height adjusting ring 51 is attached to the arms 48 of bracket 47 by means of screws 52. Height adjusting ring 51 has a height sufficient to extend to approximately the top surface of the concrete floor 14. Trim ring 53 equipped with external threads is screwed into position in height adjusting ring 51, which has internal threads adapted to engage those of the trim ring. Friction plug 54 provided with peripheral notches 56 for power cords 57 fits into a central opening in the trim ring 53 to complete the installation. In a similar manner, a connection can be made to another distribution system (not shown) in the adjacent raceway when desired for providing a communications outlet at the same location. A typical finished insulation made using the method and means of the invention is shown in FIG. 5.

It will be apparent to those skilled in the art from the foregoing description that the method and means of the invention reduces to a large extent the cost associated with the use of preset installation outlets in the prior art, while at the same time minimizing the difficulty and expense of completing an installation using the afterset coring methods heretofore known.

The foregoing detailed description has been given for clearness of understanding only, and no unnecessary limitations should be understood therefrom, as modifications will be obvious to those skilled in the art.

What is claimed is:

1. A composite preset block assembly adapted to be embedded in and covered by a concrete floor above an underfloor wire distribution duct system, which assembly is convertible to a duct outlet communicating with said system, comprising:

a block of a thermally insulating fire-resistant rupturable material suitable for permanent disposition in said floor, said block having a top, two opposed ends, and two opposed sides;

a hold-down plate substantially covering said top and said ends of said block, said plate having a top access opening through which the material forming said block can be removed, said two sides of said block being substantially open to contact with said concrete;

the dimensions of said block including its thickness being such that the void created in said concrete by the removal of said rupturable material from the assembly is suitable in size for the installation therein of a duct outlet assembly communicating with said duct system; and means for attaching said block and hold-down plate in contiguous relationship with said duct system and covering an aperture therein.

2. The assembly of claim 1 which is further provided with a removable cover cap closing said access opening in said hold-down plate.

3. The assembly of claim 1 in which said means for attaching said hold-down plate comprises tabs on opposite ends of said hold-down plate, said tabs being adapted to engage preformed slots in said duct system.

4. The assembly of claim 1 in which said hold-down plate is provided with flanges depending from two opposed edges of the top surface therefore, said flanges being adapted to become embedded in said concrete, thereby providing support for the surface of the concrete floor above said block means.

5. A method of adapting a poured concrete floor having an underfloor wire distribution duct system for providing outlet connections for said system, said method comprising the steps of:

a. presetting, in a plurality of prospective outlet positions prior to pouring said concrete, a composite block assembly in contiguous relationship with and overlying an aperture in said duct system, said composite block assembly comprising a block of a thermally insulating fire-resistant rupturable material suitable for permanent disposition in said floor, said block having a top, two opposed ends and two opposed sides, and a hold-down plate substantially covering said top and said ends of said block, said plate having a top access opening through which the material forming said block can be removed, said two sides of said block being substantially open to contact with said concrete;

the dimensions of said block inclunig its thickness being such that the void created in said concrete by the removal of said rupturable material from the assembly is suitable in size for the installation therein of a duct outlet assembly communicating with said duct system; and b. pouring concrete to form said floor, said concrete coming into contact with all exposed surface of said composite block means, including said hold-down plate and said two sides, whereby access to said distribution system can be had after said concrete sets by removing the concrete overlying the access opening in said cover plate and removing the material of said block through said access opening, to form a void in said concrete floor through which said outlet connections can be made.

6. A method of providing outlet connections in a poured concrete floor having an underfloor wire distribution duct system, said method comprising the steps of:

a. presetting, in a plurality of prospective outlet positions prior to pouring said concrete, a composite block assembly in contiguous relationship with and overlying an aperture in said duct system, said composite block assembly comprising a block of a thermally insulating fire-resistant rupturable material suitable for permanent disposition in said floor, said block having a top, two opposed ends and two opposed sides, and a hold-down plate substantially covering said top and said ends of said block, said plate having a top access opening through which the material forming said block can be removed, said two sides of said block being substantially open to contact with said concrete;

the dimensions of said block including its thickness being such that the void created in said concrete by the removal of said rupturable material from the assembly is suitable in size for the installation therein of a duct outlet assembly communicating with said duct system; and b. pouring concrete to form said floor, said concrete coming into contact with all exposed surfaces of said composite block means, including said hold-down plate and said two sides;

c. curing said concrete;

d. removing the concrete overlying the access opening in said cover plate;

e. removing the material of said block through said access opening, and f. completing an outlet connection to said wire distribution system through the void in said concrete floor created by the removal of said block.

7. the method of claim 6 which includes the additional step of adding fire-resistant material to said void remaining after the installation of said outlet connection.

* * * * *